(12) United States Patent
Hoertnagl et al.

(10) Patent No.: US 8,166,306 B2
(45) Date of Patent: Apr. 24, 2012

(54) SEMANTIC DIGITAL SIGNATURES

(75) Inventors: Christian Hoertnagl, Kilchberg (CH); James F. Riordan, Rueschlikon (CH); Daniela Bourges-Waldegg, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 12/141,245

(22) Filed: Jun. 18, 2008

(65) Prior Publication Data

US 2009/0319794 A1 Dec. 24, 2009

(51) Int. Cl.
H04L 9/32 (2006.01)
(52) U.S. Cl. .......................................... 713/176
(58) Field of Classification Search .................. 713/176
See application file for complete search history.

(56) References Cited

U.S. PATENT DOCUMENTS

| 5,995,625 | A | * | 11/1999 | Sudia et al. | 705/51 |
| 2009/0165110 | A1 | * | 6/2009 | Becker et al. | 726/9 |

OTHER PUBLICATIONS

How to Call Switzerland From the United States, [online]; [retrieved on Apr. 3, 2008]; retrieved from the Internet http://www.ehow.com/how_8681_call-switzerland-united.html.
Crytographic Hash Function, [online]; [retrieved on Apr. 7, 2008]; retrieved from the Internet http://en.wikipedia.org/wiki/Message_digest.
Digital Object Identifier, [online]; [retrieved on Apr. 3, 2008]; retrieved from the Internet http://en.wikipedia.org/wiki/Digital_object_identifier.
Uniform Resource Locator, [online]; [retrieved on Apr. 3, 2008]; retrieved from the Internet http://en.wikipedia.org/wiki/uniform_Resource_Locator.
Web 2.0, [online]; [retrieved on Apr. 3, 2008]; retrieved from the Internet http://en.wikipedia.org/wiki/Web_2.
URL Normalization, [online]; [retrieved on Apr. 3, 2008]; retrieved from the Internet http://en.wikipedia.org/wiki/URL_normalization.
Permalink, [online]; [retrieved on Apr. 3, 2008]; retrieved from the Internet http://en.wikipedia.org/wiki/Permalink.
Wikipedia, "Web Ontology Language"; [online]; [retrieved on Apr. 8, 2008]; retrieved from the Internet http://en.wikipedia.org/wiki/Web_Ontology_Language; pp. 1-4.
Wikipedia, "RDF Schema"; [online]; retrieved on Apr. 8, 2008; retrieved from the Internet http://en.wikipedia.org/wiki/RDF_Schema; pp. 1-2.

(Continued)

Primary Examiner — Edan Orgad
Assistant Examiner — Harris Wang
(74) Attorney, Agent, or Firm — Cantor Colburn LLP; Daniel Morris (57) ABSTRACT

A method is provided for adding intended meaning to digital signatures. A message, being base content, is received to be signed. Assertions, ontologies, and description of a reasoner are adjoined to the message. Ontologies are a formal specification of vocabulary and rules used to state the assertions. The reasoner validates the assertions against the corresponding ontologies. A compound message is formed including the message, the assertions, the ontologies, and the reasoner. The compound message is signed using a cryptographic digital signature, where the assertions indicate an intended meaning of the digital signature. During verification of semantic signatures, a digital signature is received for a compound message, where the compound message includes assertions, ontologies, and reasoner. The digital signature is verified, and the compound message structure is checked for semantic signature conformance. In response to proper verification, the reasoner is utilized to verify a conformance of the assertions to the ontologies.

20 Claims, 6 Drawing Sheets

OTHER PUBLICATIONS

Wikipedia, "Semantic Web", [online]; retrieved on Apr. 8, 2008; retrieved from the Internet http://en.wikipedia.org/wiki/Semantic_Web; pp. 1-9.

Wikipedia, "Resource Description Framework", [online]; retrieved on Apr. 8, 2008; retrieved from the Internet http://en.wikipedia.org/wiki/Resource_Description_Framework; pp. 1-9.

* cited by examiner

SEMANTIC DIGITAL SIGNATURES

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. and each of the below listed applications is hereby incorporated herein by reference in its entirety: Ser. No. 12/141,255 filed Jun. 18, 2008.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of Invention

Exemplary embodiments relate to digital signatures, and particularly to mechanisms for including the intended meaning of digital signatures.

2. Description of Background

Figure 1:
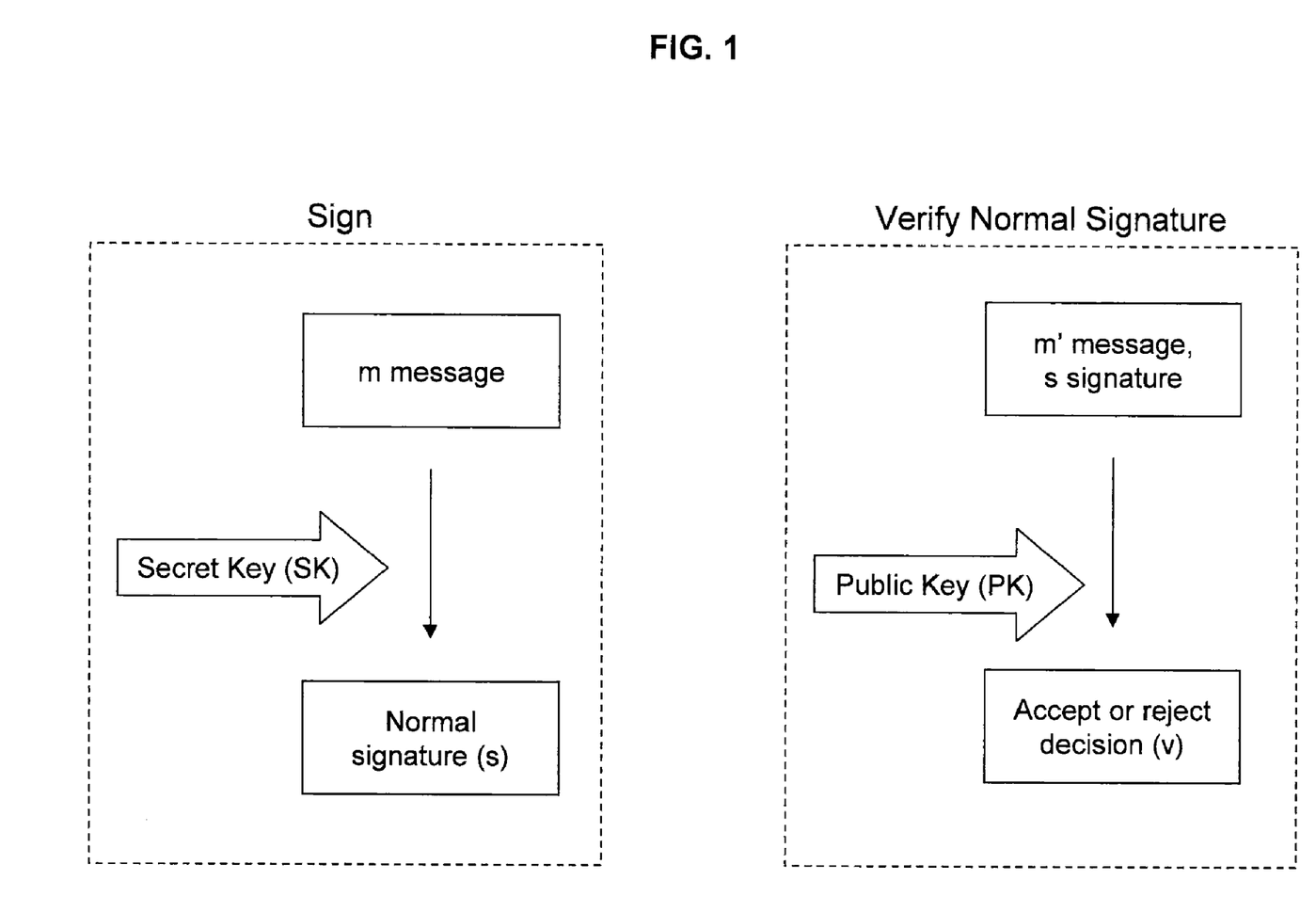
FIG. 1 illustrates a typical digital signature utilizing a secret key to sign the message and a public key to validate the signature.

Standard digital signatures schemes (based on asymmetric cryptography) are defined by two algorithms: a signing algorithm and a verification algorithm. The signing algorithm produces a signature s when given as input a message m and a secret key SK. The verification algorithm takes as input a message m', a signature s, and a verifying key PK and yields an accept or reject decision v. FIG. 1 illustrates a typical digital signature utilizing a secret key to sign the message and a public key to validate the signature based on the received message.

Such schemes on their own do not adequately capture the rich semantics of real world signatures, where there is usually an intended meaning associated to a signature (e.g., "I agree with the document", "I have verified the content of the document", "I have checked for compliance", etc). Hence, cryptographic signatures are used within a specific framework; in these frameworks, the meaning of a digital signature is typically split between the type of key and the content of the thing signed. Regarding the type of key, the categories are ad hoc, not well specified and very coarse scale. For example, there is a class of keys for (executable) code signing but this does not specify if the signer is the author, a security reviewer, the legal owner, etc. In the case of the meaning being included in the content of the thing signed, the semantics are simply implied, communicated by out-of-bound conventions or expressed in a natural language (e.g., a human-readable description) and thus are not machine processable and generally not well specified.

Automatic processing is becoming increasingly necessary, for example, in the compliance space, where complex rules need to be applied to large numbers of documents, making it nearly impossible to manually check if the rules are being followed. Such automatic processing is made difficult by the fact that the intended meaning of digital signatures is defined only implicitly (e.g., by human reading of the document).

A need exists for providing digital signatures that explicitly incorporate the meaning of the digital signature in a way that enables efficient, automatic processing by computational means.

SUMMARY

In accordance with exemplary embodiments, a method is provided for adding intended meaning to digital signatures. A message (base content) to be signed is received. Assertions are adjoined to the message together with a formal specification of the vocabulary and rules (ontologies) used to state the assertions, and a description of the reasoner necessary to validate the assertions against their ontologies, to form a compound message (semantically annotated base content). Additional inputs to the reasoner (world beliefs) may also be adjoined to the compound message. The compound message is signed using a cryptographic digital signature. The assertions indicate the intended meaning of the digital signature, and the digital signature is applied to the compound message.

Also, in accordance with exemplary embodiments, a method is provided for verifying the presence of the assertions indicating the intended meaning of a digital signature, as well as their conformance to the specified ontologies using the described reasoner (and world beliefs if present). A digital signature and a compound message are received. The digital signature is verified. The presence of the assertion and its conformance to specified ontology are verified using the reasoner (and world beliefs if present), and the assertions indicate the intended meaning of the digital signature.

System and computer program products corresponding to the above-summarized methods are also described and claimed herein.

Additional features are realized through the techniques of the present invention. Other embodiments and features of the invention are described in detail herein and are considered a part of the claimed invention. For a better understanding of features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION OF EXEMPLARY EMBODIMENTS

Exemplary embodiments provide a scheme for adding semantics to digital signatures, which can be built upon existing cryptographic signature schemes. In accordance with exemplary embodiments, the semantics may be encoded as concise, machine-readable references to terms from shared ontologies that establish the possible elements of discourse.

In accordance with exemplary embodiments, semantic signatures are built on top of standard cryptographic signatures. Semantic signatures are constructed by enforcing a data schema on the message that is input to the signing algorithm, and verifying the data schema on the message in the validation algorithm. Message here refers therefore to the semantically annotated base content. In exemplary embodiments, the validation algorithm performs the necessary semantic checks as well by using a previously configured reasoner. The prescribed data schema consists of the actual content to be signed (base content), either directly or via cryptographic reference (e.g., cryptographic hash of base content), one or more assertions specifying the intended meaning of the signature in a format suitable for machine processing (e.g., Resource Description Framework (RDF)), the ontologies where the assertions take their vocabulary from, a description of the reasoner that should be used to check the validity of the assertions with respect to their ontologies (note that validity here refers to a syntactic conformance to the rules specified in the ontology), and, optionally, additional inputs needed by the reasoner (world beliefs). In exemplary embodiments, the reasoner is an entity that implements a reasoning algorithm and that is available during semantic signature validation; the entity per-se is not included in the compound message (as it is typically e.g. the byte code or native image of a software implementation, or a specialized piece of hardware), but rather a description of the entity (e.g. the digest of the byte code, plus constraints on legitimate environments where it may execute). In exemplary embodiments the reasoner can determine subsumption relationships between terms, i.e., whether one term denotes entities that are more general than those identified by the other.

Figure 2:
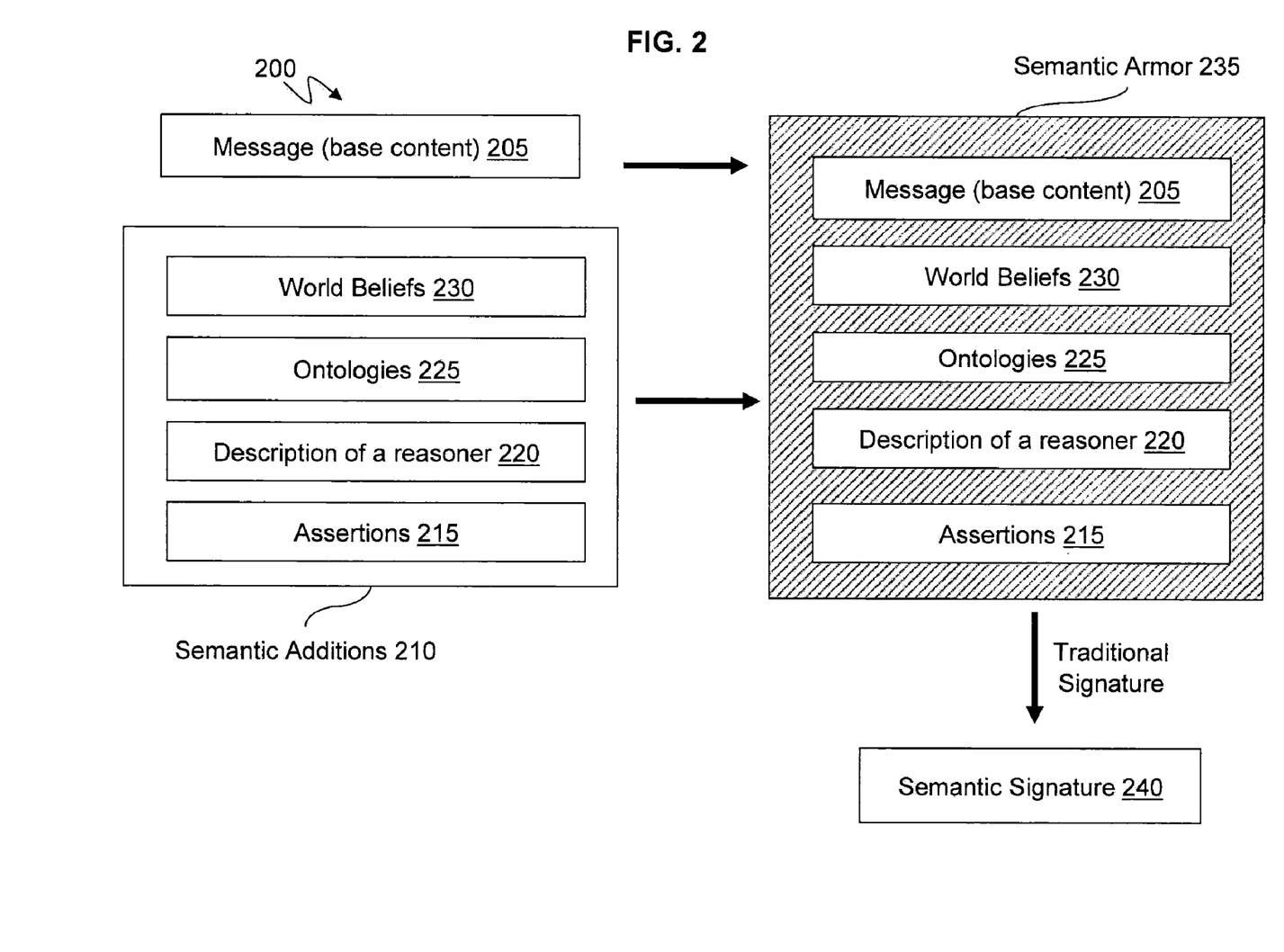
FIG. 2 illustrates a block diagram for a signing procedure for semantic digital signatures in accordance with exemplary embodiments.

FIG. 2 illustrates a block diagram 200 of a signing procedure for semantic digital signatures in accordance with exemplary embodiments.

The block diagram 200 includes a message (base content) 205. The base content of the message 205 is not limited and may include any content understood by one skilled in the art (such as, e.g., a human-readable text, an executable program, etc.). Also, in accordance with exemplary embodiments, elements (such as the message, assertions, ontologies, reasoner and/or world beliefs) discussed herein may be included verbatim or via a bound reference to the elements, and exemplary embodiments are not meant to be limited either way. More regarding bound references is discussed in a co-pending patent application commonly assigned to International Business Machines Corporation under Attorney Docket Number CH920070113US1, which is herein incorporated by reference.

Semantic additions 210 are adjoined to the message 205. The semantic additions 210 may include assertions or bound references to assertions 215 that are made by the signer. The assertions 215 may be structured assertions about the intended meaning of the signature being performed on the message 205.

The semantic additions 210 may include ontologies or bound references to ontologies 225 for each assertion 215. Ontologies 225 may define universal terms that are used to describe the intended meaning of the signature. An example of an ontology formalism is the Web Ontology Language (OWL), which is a family of knowledge representation languages for authoring ontologies.

Also, a description of a reasoner or a bound reference to a description of a reasoner (algorithm) 220 may be included in the semantic additions 210. The description of a reasoner 220 may specify further requirements that the execution platform must meet, e.g., in terms of algorithm versions or trusted computing platform profiles.

World beliefs or a bound reference to world beliefs 230 may be included in the semantic additions 220, and is intended as input to the reasoner. World beliefs 230 is intended to be open and may include additional information that needs to be input to the reasoner 220.

In exemplary embodiments, a bound reference may be defined as a unique identifier for a resource whereby the unique identifier is bound to the content it identifies. Bound references are useful because including the whole content in general makes for unmanageably verbose messages. However, signing just a reference (as is done in the prior art) is a bad idea, since the item referenced might change.

An example of a bound reference is a bound URL (or BURL). A non-limiting example of a BURL may contain a hash of a content binding document that the BURL points to, and the content binding document may in turn contain a hash of the actual content.

As a non-limiting example, the following BURL is provided:

https://veracite.zurich.ibm.com/burls/d5351.....51ab66?digest-method=md5 which serves the document:

```
<burl>
  <permalink>
http://en.wikipedia.org/w/index.php?title=Currying&oldid=
118180680
  </permalink>
  <logical-link>http://en.wikipedia.org/wiki/Currying</logical-link>
  <fragment-identifier>Scheme</fragment-identifier>
  <content-digest-method>md5</content-digestmethod>
  <content-digest>68b329da9893e34099c7d8ad5cb9c940</digest>
<content-normalization-method>https://veracite.zurich.ibm.com/
normalization/simplehtml_1.0</normalization>
</burl>
```

A BURL can also be realized by in-lining this information as part of the URL's query string parameters. The above explanation simplifies certain details and is only meant to illustrate an example of a bound reference using a BURL. For a detailed description see co-pending patent application commonly assigned to International Business Machines Corporation under Attorney Docket Number CH920070113US1.

The elements (e.g., the assertions 215, ontologies 225, description of a reasoner 220, and/or world beliefs 230) included in the semantics additions 210 may be adjoined to the message (base content) 205 or to a bound reference of the message 205. The assertions 215, ontologies 225, description of a reasoner 220 and/or world beliefs 230 may be XML documents, and the XML documents may be adjoined to the message 205 verbatim, or a bound reference may be generated for each and adjoined to the message 205. The reasoner described by 220 can be used to validate the assertions 215 and their conformance to specified ontologies 225. Also, it is understood that additional elements may be included in the semantic additions 210, and those additional elements may be adjoined to the message 205 in accordance with exemplary embodiments.

In accordance with exemplary embodiments, the assertions 215, ontologies 225, description of a reasoner 220, and/or world beliefs 230 are adjoined to the message 205 in a semantic armor 235 (i.e., a compound message). The semantic armor 235 may be signed using a traditional cryptographic signature resulting in a semantic signature 240. The semantic signature 240 therefore also includes information about the intended meaning of the signature.

For illustrative purposes, an example message (base content that does not include semantics as discussed herein) could be a medical diagnosis. This is a case in point where it is important to know the intent conveyed by applying a digital signature. Two possible, markedly different intents are: "I am a medical professional and by signing this message I certify that the contained diagnosis is correct", or "I am the creator of the text processing software, and by signing this message I certify that it has not been tampered with since it was typed in". However in existing digital signatures the intent of the above message is not explicitly clear and it may be presumptuous to assume a particular intent.

Unlike existing digital signatures, exemplary embodiments provide a semantic digital signature (e.g., the semantic signature 240) that is structured for machine processing in terms of expressing an intended meaning of digital signatures.

As another example, with existing digital signatures, a medical diagnosis may be written up using word processing software, and then communicated as an attachment in a secure e-mail system. In this case, the document would be digitally signed but there is still a lack of clarity with regard to the signature. However, semantic digital signatures of exemplary embodiments provide support for expressing intended meaning explicitly, more precisely, and for general purposes, so that the semantic digital signature can be subjected to efficient automatic processing. For instance, one may want to check whether the medical diagnosis was approved by a suitably qualified medical professional, in which case assertions to that effect (signer approves the diagnosis and signer possesses medical degree) should be included in the signature itself in accordance with exemplary embodiments. The legitimate intent of this semantically signed document is different than if the document were signed by an arbitrary party possessing a signature key (but not demonstrably expressing the required professional credentials).

Figure 3:
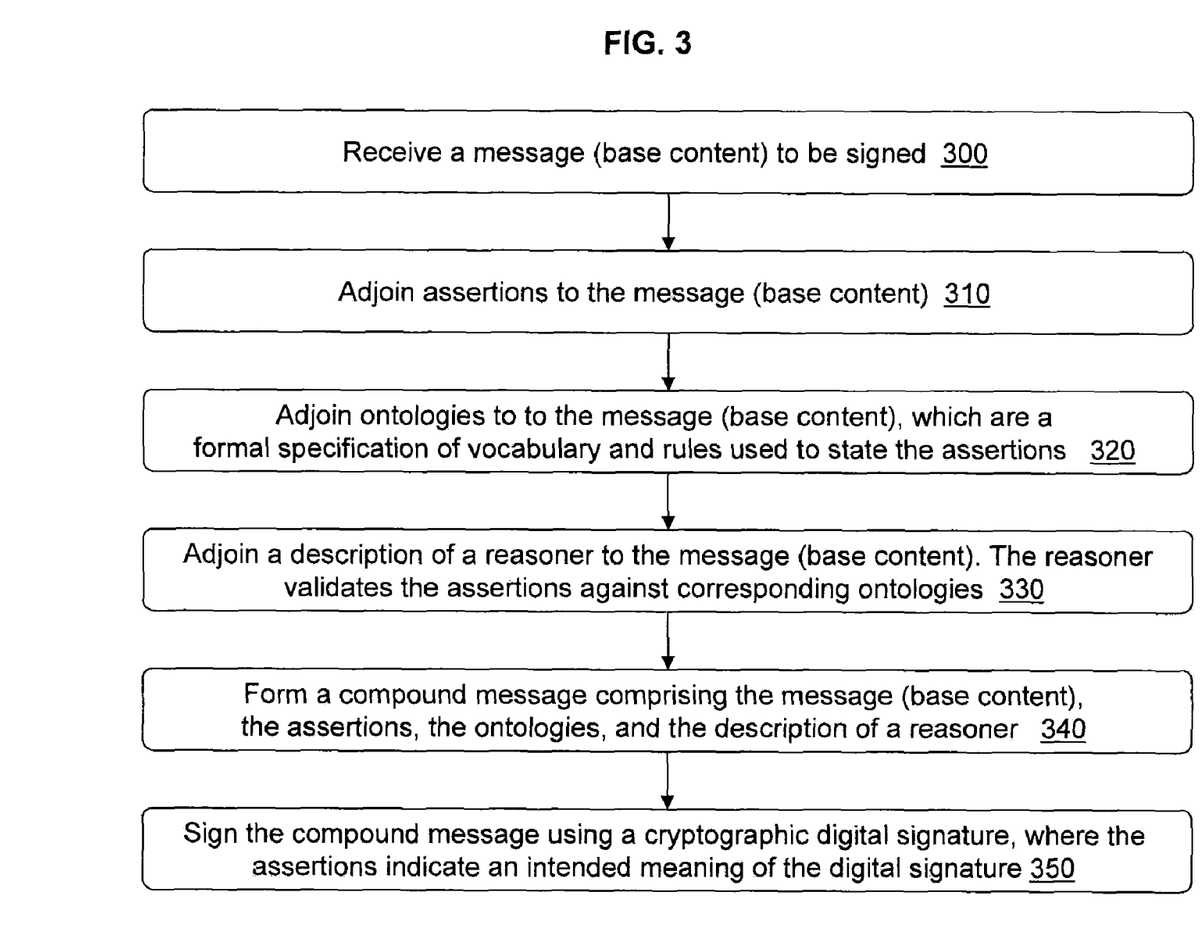
FIG. 3 illustrates a method for signing with a digital signature using a semantic signature scheme in accordance with exemplary embodiments.

FIG. 3 illustrates a method of signing with a digital signature using the semantic signature scheme in accordance with exemplary embodiments.

A message (base content) 205 to be signed is received at 300. Assertions 215 are adjoined to the message at 310. A fixed (human readable) string may be prepended to the message 205 in order to make it explicit that a semantic signature validation is required (as opposed to a traditional digital signature validation). The fixed string may read, e.g., "the following should be considered meaningless except in the context of a semantic signature described in BURL https://xyz . . . ". Alternatively and/or additionally, a set of strings containing (the same) descriptive text in different languages can be given, and in this case each individual string is accompanied by a language tag, e.g., following RFC 1766 conventions. Also, a fixed (human readable) string may be appended to prevent different meanings based on parse order (e.g., as with Hebrew). The assertions 215 can specify the intended meaning of the digital signature in a machine processable fashion.

Ontologies 225 are adjoined to the message 205, where the ontologies 225 are a formal specification of vocabulary and rules used to state the assertions at 320.

The description of a reasoner 220 is adjoined to the message 205, and the reasoner described by 220 validates the assertions 215 against corresponding ontologies 225 at 330. For example, there may be various individual assertions 215, and each individual assertion may correspond to a particular ontology. The reasoner described by 220 is configured to apply the corresponding ontology to the respective assertion to validate the conformance of each individual assertion in accordance with exemplary embodiments.

A compound message is formed that comprises the message 205, the assertions 215, the ontologies 225, and the description of a reasoner 220 at 340. The compound message is signed using a cryptographic digital signature at 350. The digital signature, for the compound message, is generated according to an underlying algorithm (such as the signing algorithm of an asymmetric cryptography-based signature scheme). A traditional digital signature may be used to sign compound message (e.g., the semantic armor 235), which results in the semantic signature 240 according to exemplary embodiments.

Additionally, world beliefs 230 may be adjoined to the message 205, and the reasoner described by 220 is configured to apply the corresponding ontology to the respective assertion in light of the world beliefs.

Further, in accordance with exemplary embodiments, adjoining the assertions to the message may comprise inputting the intended meaning of the digital signature in, e.g., a user interface, and adjoining the intended meaning of the digital signature to the message as discussed herein.

Now, consider an implementation of exemplary embodiments in which a compound message may be created with a fixed structure for holding its constituent parts, and the constituent parts may include the message (base content) 205, assertions 215, description of a reasoner 220, ontologies 225, and/or world beliefs 230. The constituent parts may be inserted verbatim or by bound reference. The constituent parts may be obtained by utilizing, e.g., a user interface in which the signer can specify the intended meaning of the signature in accordance with exemplary embodiments. One skilled in the art would understand how to obtain the constituent parts, and no implicit or explicit limitations should be ascribed to exemplary embodiments. An eligible concrete data structure may append the XML fragments for these constituent parts into a new XML fragment with corresponding subtrees. While no particular concrete data structure is prescribed, each eligible one should meet these requirements: it should allow for normalization (e.g., white space removal), such that different copies of the same logical document lead to the same signature values. It should allow isolated retrieval of each constituent part, given the whole message, and a distinction between instances of this data structure and other "random" byte strings must be possible.

The following is a non-limiting example. The constituent parts of a semantic armor 235 may include the message 205 which is the text of a medical diagnosis (XML serialization or its bound reference). Assertions 215 state that the signer has verified the diagnosis and approves it, and that the signer possesses a medical degree (RDF/XML serialization or its bound reference). The description of a reasoner 220 identifies a reasoner or set of reasoners, for instance, a particular version of the Pellet OWL reasoner (RDF/XML serialization or its bound reference). Ontology 225 introduces terms for stating assertions, for instance the terms "has verified the diagnosis" and "approves the diagnosis" (RDF/XML serialization or its bound reference). World beliefs 230 are further inputs to the reasoner that are treated like assertions, but have a wider scope in terms of being shared as "background knowledge"

between different semantic signatures (XML/RDF serialization or its bound reference). World beliefs 230 for instance could state that medical diagnoses that concern heart conditions must be signed by cardiologists, not just general practitioners.

Figure 4:
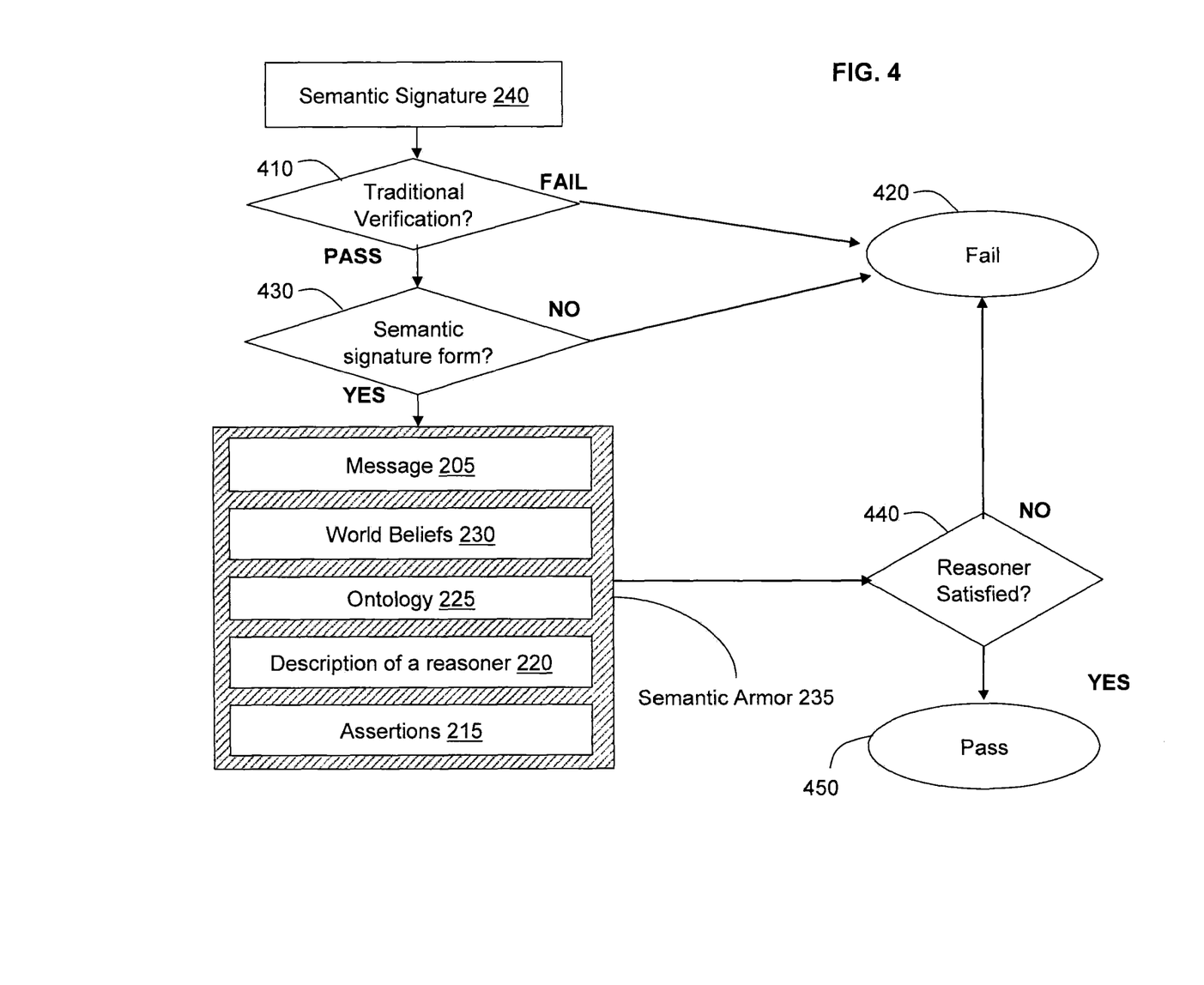
FIG. 4 illustrates a block diagram for verifying a digital signature using a semantic signature scheme in accordance with exemplary embodiments.

FIG. 4 illustrates a block diagram for verifying a digital signature using the semantic signature scheme in accordance with exemplary embodiments.

The semantic signature 240 may be verified using a traditional verification process block 410. For example, the semantic signature 240 may have been generated using a private (secret) key, and the semantic signature 240 can be verified using a public key.

It is determined whether the (traditional digital signature part of the) semantic signature 240 passes or fails in a traditional verification block 410. If it is determined that semantic signature 240 cannot be verified (using, e.g., a public key) during the traditional verification block 410, the semantic signature 240 goes to the fail block 420.

If the semantic signature 240 is verified using the traditional verification block 410, it is determined at the semantic signature form block 430 whether the signature is a semantic signature. If the signature is a normal signature, then the semantic signature form block 430 goes to the fail block 420. If the semantic signature 240 is in semantic signature form, the semantic armor 235 is analyzed. For example, the signature is in the semantic signature form, if the message that was signed conforms to the semantic signature data schema, that is, it is an instance of the data structure produced that has, e.g., XML fragments of the constituent parts as discussed above. It is understood that the semantic armor 235 is not limited to the exact elements depicted therein, and more or fewer elements may be contained in the semantic armor 235.

The reasoner described by 220 has to be satisfied in block 440. If the reasoner described by 220 is not satisfied, then the verification of the semantics fails and proceeds to the fail block 420. As a practical non-limiting example, the description of reasoner 220 may state that the employed reasoner must use an implementation in an archive/jar file of a given size and must run on a particular operating system platform. Both of these properties can be confirmed at runtime, and they ensure in practice that a well-defined reasoner (from a known source) is in operation. A check of this kind is required, since as with human reasoning it is not only crucial to know what the reasoning is about but also that reasoning is performed by a party who respects the rules.

If the reasoner described by 220 is satisfied in the block 440, the verification of the semantics goes to the pass block 450. The world beliefs 230 may be included as an input to the reasoner 220 in block 440 within the semantic armor 235.

As discussed herein, the reasoner described by 220 is used to verify the conformance of the assertions to the corresponding ontologies, and the following non-limiting example of a reasoner is given below.

```
If A subsumes A' given the specified bound input
  (e.g., the ontology and the world beliefs)
    return true
  else
    return false
  endif
```

In the simplest case of the above example, the reasoner may check for equality between A and A'. However, given the definition of terms in ontologies this notion can be widened. For instance, the semantic additions 210 may state that the signer possesses a medical degree as a cardiologist, and that cardiologist are specialized medical doctors. From this knowledge, a reasoner can derive that statements about cardiologists are subsumed by statements about medical practitioners, because of the stated relationships between the two terms. This is convenient for formulating potentially complex conditions by reference to relatively few abstract terms. If no particular relationships between terms are stated (which may be the case with simple ontologies), then checking for subsumption corresponds to checking for equivalence between A and A'. Although the previous example was provided to illustrate possible options for a reasoner, it is understood that exemplary embodiments are not limited to the previous example. Indeed, other reasoners using various algorithms may be employed in accordance with exemplary embodiments.

Figure 5:
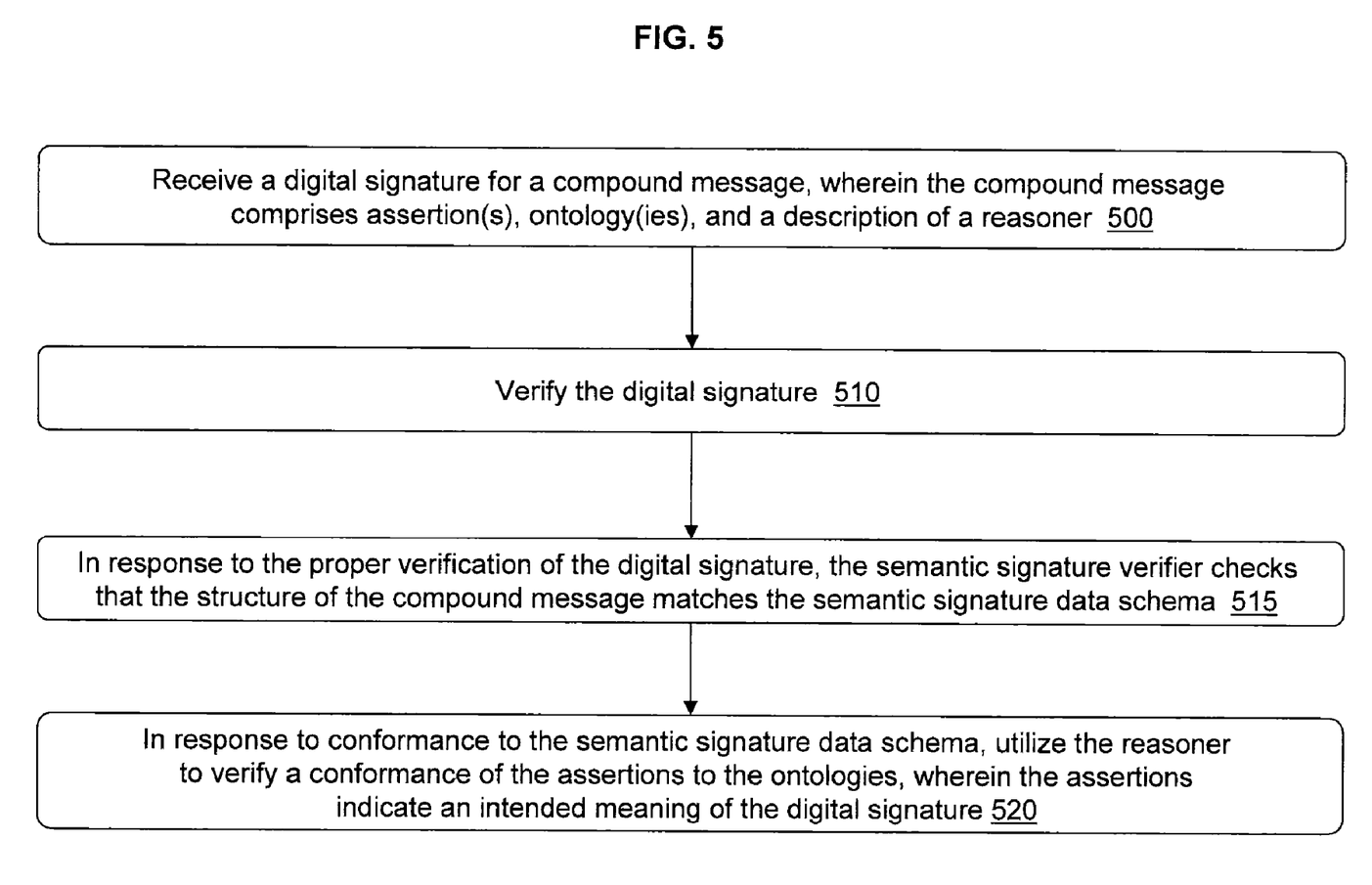
FIG. 5 illustrates a method for verifying a digital signature using a semantic signature scheme in accordance with exemplary embodiments.

FIG. 5 illustrates a method for verifying a digital signature using the semantics signature scheme in accordance with exemplary embodiments.

A digital signature is received for a compound message at 500. The compound message includes an assertion, an ontology, and a description of a reasoner.

The digital signature is verified at 510. The digital signature may be verified using an existing technique.

In response to the proper verification of the digital signature, the semantic signature verifier checks that the structure of the compound message matches the semantic signature data schema at 515.

In response to the compound message structure being in conformance to the semantic signature data schema, the reasoner is utilized to verify a conformance of the assertion to the ontology, where the assertion indicates an intended meaning of the digital signature at 520.

Figure 6:
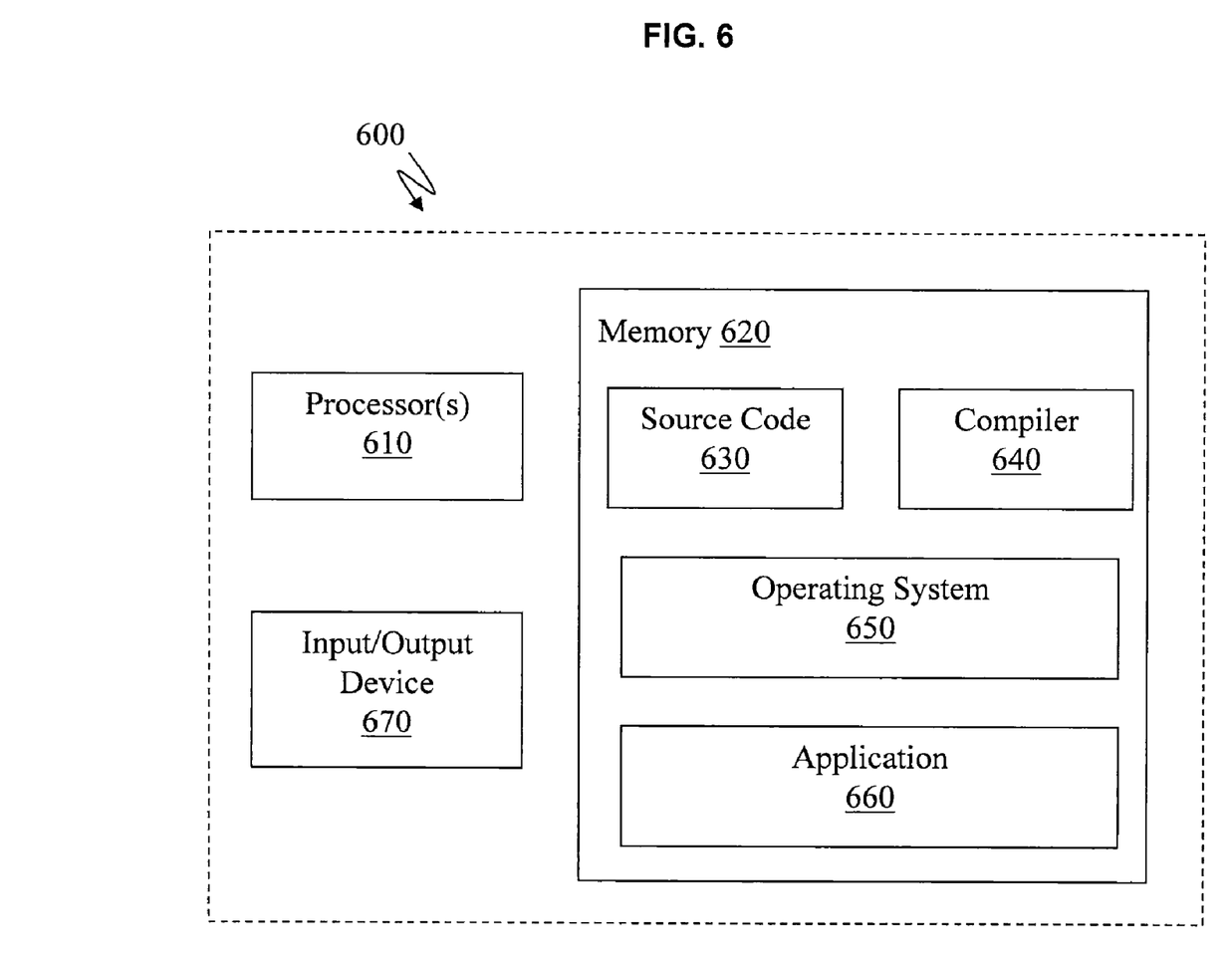
FIG. 6 illustrates an example of a computer having capabilities, which may be included in exemplary embodiments.

FIG. 6 illustrates an example of a computer 600 having capabilities, which may be included in exemplary embodiments. Various methods, procedures, and techniques discussed herein may also utilize the capabilities of the computer 600. One or more of the capabilities of the computer 600 may be incorporated in any element discussed herein, such as the message 205, world beliefs 230, ontology 225, description of reasoner 220, assertions 215, semantic additions 210, and/or semantic armor 235.

Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and an application 660 (which may be one or more applications) of the exemplary embodiments. As illustrated, the application 660 comprises numerous functional components for implementing the features and operations of the exemplary embodiments. The application 660 of the computer 600 may represent various applications, agents, software components, etc., but the application 660 is not meant to be a limitation.

The operating system 650 may control the execution of other computer programs, and provides scheduling, input-output control, file and data management, memory management, and communication control and related services.

The application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices such as, for example but not limited to, a mouse, keyboard, scanner, microphone, camera, etc. Furthermore, the I/O devices 670 may also include output devices, for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices and systems discussed herein, and it is understood that additional software and hardware components may be included in the various devices and systems discussed in exemplary embodiments.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method on a computer for adding intended meaning to digital signatures comprising:
    forming a compound message on the computer which comprises:
        receiving a message, being base content, to be signed;
        adjoining assertions to the message;
        adjoining ontologies to the message, wherein the ontologies are a formal specification of vocabulary and rules used to state the assertions;
        adjoining a description of a reasoner to the message, wherein the reasoner is configured to validates the assertions against the corresponding ontologies, the reasoner is configured to validate a syntactic conformance of the assertions to the rules of the ontologies, and the reasoner is configured to determine subsumption relationships between terms in the assertion including when one term denotes entities more general than other entities; and
        adjoining world beliefs to the message, wherein the world beliefs provide background knowledge to the reasoner;
    wherein forming the compound message on the computer comprises combining each of the message, the assertions, the ontologies, the description of the reasoner, and the world beliefs into a single semantic structure to be signed with a key as the compound message; and
    signing the compound message being the single semantic structure using the key such that the message, the assertions, the ontologies, the description, and the world beliefs are included within the compound message signed by the key, wherein the assertions indicate an intended meaning of the key when verified.

2. The method of claim 1,
    wherein the compound message is formed such that semantic verification comprises:
        a first verification to confirm that the compound message is signed with the key which is a cryptographic digital signature;
        responsive to passing the first verification a second verification to confirm that the compound message is the single semantic structure that includes the message, the assertions, the ontologies, the description of the reasoner, and the world beliefs therein; and
        responsive to the second verification confirming that the message, the assertions the ontologies, the description of the reasoner, and the world beliefs are in the compound message signed with the key, the second verification passes and the reasoner takes as input the message, the assertions, the ontologies, and the world beliefs to confirm semantics.

3. The method of claim 1, wherein the adjoined assertions produce a well structured format.

4. The method of claim 3, wherein the adjoined assertions produce an XML fragment.

5. The method of claim 1, wherein the adjoined ontologies and the adjoined description of the reasoner produce XML fragments.

6. The method of claim 1, wherein the intended meaning of the digital signature is input by a user as the assertions.

7. The method of claim 1, wherein at least one of the message, the assertions, the ontologies, and the description of the reasoner is a bound reference.

8. The method of claim 2, wherein the world beliefs is a bound reference.

9. A method on a computer for verifying a digital signature using a semantics signature scheme comprising:
    receiving on the computer a digital signature for a compound message, wherein the compound message comprises;
    receiving a message, being base content, to be signed;
    adjoining assertions to the message;
    adjoining ontologies to the message, wherein the ontologies are a formal specification of vocabulary and rules used to state the assertions;
    adjoining a description of a reasoner to the message, wherein the reasoner is configured to validates the assertions against the corresponding ontologies, the reasoner is configured to validate a syntactic conformance of the assertions to the rules of the ontologies, and the reasoner is configured to determine subsumption relationships between terms in the assertion including when one term denotes entities more general than other entities; and
    adjoining world beliefs to the message, wherein the world beliefs provide background knowledge to the reasoner;
    wherein forming the compound message comprising on the computer comprises combining each of the message, the assertions, the ontologies, the description of the reasoner, and the world beliefs into a single semantic structure to be signed with a key as the compound message; and
    signing the compound message being the single semantic structure using a signature the key such that the message, the assertions, the ontologies, the description, and the world beliefs are included within the compound message signed by the key, wherein the assertions indicate an intended meaning of the key when verified
    verifying the digital signature;
    verifying that a structure of the compound message conforms to a semantic signature data schema; and
    in response to proper verification of the digital signature and the structure of the compound message on the computer, utilizing the described reasoner to verify a conformance of the assertions to the ontologies, wherein the assertions indicate an intended meaning of the digital signature.

10. The method of claim 9, wherein the compound message further comprises world beliefs.

11. The method of claim 10, wherein the reasoner verifies the conformance of the assertions to the ontologies in light of the world beliefs.

12. The method of claim 9, wherein the compound message is machine-processable.

13. The method of claim 10, wherein the assertions, the ontologies, and the world beliefs are inputs to the reasoner.

14. The message of claim 13, wherein the assertions must satisfy the logic of the reasoner based upon the ontologies and the world beliefs.

15. A computer program product, tangibly embodied on a non-transitory computer readable medium, for adding intended meaning to digital signatures, the computer program product including instructions for causing a computer to execute a method, comprising:
    forming a compound message on the computer which comprises:
        receiving a message, being base content, to be signed;
        adjoining assertions to the message;

adjoining ontologies to the message, wherein the ontologies are a formal specification of vocabulary and rules used to state the assertions;

adjoining a description of a reasoner to the message, wherein the reasoner is configured to validates the assertions against the corresponding ontologies, the reasoner is configured to validate a syntactic conformance of the assertions to the rules of the ontologies, and the reasoner is configured to determine subsumption relationships between terms in the assertion including when one term denotes entities more general than other entities; and adjoining world beliefs to the message, wherein the world beliefs provide background knowledge to the reasoner;

wherein forming the compound message on the computer comprises combining each of the message, the assertions, the ontologies, the description of the reasoner, and the world beliefs into a single semantic structure to be signed with a key as the compound message; and signing the compound message being single semantic structure using the key such that the message, the assertions, the ontologies, the description, and the world beliefs are included within the compound message signed by the key, wherein the assertions indicate an intended meaning of the key when verified.

16. The computer program product of claim 15, wherein the compound message is formed such that semantic verification comprises:
a first verification to confirm that the compound message is signed with the key which is a cryptographic digital signature;
responsive to passing the first verification, a second verification to confirm that the compound message is the single semantic structure that includes the message, the assertions, the ontologies, the description of the reasoner, and the world beliefs therein; and
responsive to the second verification confirming that the message, the assertions, the ontologies, the description of the reasoner, and the world beliefs are in the compound message signed with the key, the second verification passes and the reasoner takes as input the message, the assertions, the ontologies, and the world beliefs to confirm semantics.

17. The computer program product of claim 15, wherein the adjoined assertions produce a well structured format.

18. The computer program product of claim 17, wherein the adjoined assertions produce an XML fragment.

19. The computer program product of claim 15, wherein the adjoined ontologies and the adjoined description of the reasoner produce XML fragments.

20. The computer program product of claim 15, wherein the intended meaning of the digital signature is input by a user as the assertions.

* * * * *